US007558964B2

(12) United States Patent
Bermudez et al.

(10) Patent No.: US 7,558,964 B2
(45) Date of Patent: Jul. 7, 2009

(54) CUED ONE-TIME PASSWORDS

(75) Inventors: Carlos David Bermudez, Miami, FL (US); Joseph William Cropper, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/225,681

(22) Filed: Sep. 13, 2005

(65) Prior Publication Data
US 2007/0061865 A1      Mar. 15, 2007

(51) Int. Cl.
*H04L 9/00* (2006.01)
(52) U.S. Cl. .......................................... 713/183; 726/6
(58) Field of Classification Search .................. None
See application file for complete search history.

(56) References Cited

U.S. PATENT DOCUMENTS

| 5,345,549 | A  | * | 9/1994 | Appel et al. | ................. | 715/741 |
| 2004/0006710 | A1 | * | 1/2004 | Pollutro et al. | .............. | 713/201 |
| 2006/0218408 | A1 | * | 9/2006 | Serpa | ......................... | 713/183 |
| 2007/0028105 | A1 | * | 2/2007 | Hynek | ......................... | 713/170 |

OTHER PUBLICATIONS

Logging In With One-Time Passwords Via SSH, http://www.cs.columbia.edu/~crf/crf-guide/resources/network/otp-ssh.html, May 5, 2002, pp. 1-2.

* cited by examiner

*Primary Examiner*—Christopher A Revak
*Assistant Examiner*—Brett Squires
(74) *Attorney, Agent, or Firm*—Owen J. Gamon (57) ABSTRACT

A method, apparatus, system, and signal-bearing medium that, in an embodiment, receive cues, one-time passwords, and a presentation order. The cues and one-time passwords are associated with a user name. In response to a cue request, the cues are presented in the presentation order and input data is received. If the input data matches the associated one-time password, then access to secure information is granted and the one-time password is invalidated. If the input data does not match the associated one-time password, then access to secure information is denied. In various embodiments, the cues may be text, images, audio, or video. In this way, in an embodiment, one-time passwords may be used in response to cues, which may increase security when accessing information from a non-trusted client because if the one-time password is misappropriated via the non-trusted client, the one-time password is no longer valid for future use.

16 Claims, 5 Drawing Sheets

FIG. 1

LOG-IN USER INTERFACE     200

USER NAME    [ JOE ] 205

PASSWORD    [     ] 210

I AM LOGGING IN VIA A NON-TRUSTED CLIENT [✓] 215    [ OK ]

FIG. 2

CUE USER INTERFACE     300

| 305 CUE | 310 ORDER | 315 ONE-TIME PASSWORD |
|---|---|---|
| BOOK | 1 | OPERATING SYSTEM CONCEPTS |
| KITTEN | 3 | MY DOG RALPH |
| SONG | 2 | JINGLE BELLS |
| RESTAURANT | 4 | BURGERS AND FRANKS |

ONE-TIME PASSWORD LOG-IN USER INTERFACE    400

405 CUE: BOOK

ONE-TIME PASSWORD   [ OPERATING SYSTEM CONCEPTS ] 410   [ OK ]

FIG. 4

USER DATA 162

| USER NAME (515) | REGULAR PASSWORD (520) | |
|---|---|---|
| JOE | X2234A | 505 |
| CARLOS | Y5D3H | 510 |

FIG. 5

CUE DATA 164

| USER NAME (615) | CUE (620) | ONE-TIME PASSWORD (625) | |
|---|---|---|---|
| JOE | BOOK<br>SONG<br>KITTEN<br>RESTAURANT | OPERATING SYSTEM CONCEPTS<br>JINGLE BELLS<br>MY DOG RALPH<br>BURGERS AND FRANKS | 605 |
| CARLOS | STREET<br>CASHEWS | NORTHERN HEIGHTS DRIVE<br>SALTED ALMONDS | 610 |

CUED ONE-TIME PASSWORDS

FIELD

This invention generally relates to computer systems and more specifically relates to cued one-time passwords.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Today's more powerful computers are often connected in networks, and a user at one computer, often called a client, may wish to access information at multiple other computers, often called servers, via a network. Many applications on these servers require a password before allowing access, in order to safeguard confidential information. For example, users might need passwords to access various accounts, such as business e-mail, personal e-mail, online banking, mortgage accounts, news services, classified ads, or online shopping.

In the past, users typically accessed these accounts via a trusted client, such as a client that the user is certain does not contain a key-logging program or Trojan horse that could eavesdrop on the user's keystrokes and capture the user's password. For example, users may trust their own home computers because they personally execute anti-virus and anti-spyware tools on these clients on a regular basis. But, increasingly, users are accessing their accounts from computers that are non-trusted clients because the users do not personally control them. For example, users may wish to check their bank account balances from a client computer at an Internet cafe or a public library. A user of such non-trusted clients has little opportunity to verify that the clients do not contain harmful code, which could misappropriate the user's password.

Hence, a better technique for protecting a user's password from misappropriation at a non-trusted client is needed.

SUMMARY

A method, apparatus, system, and signal-bearing medium are provided that, in an embodiment, receive cues, one-time passwords, and a presentation order. The cues and one-time passwords are associated with a user name. In response to a cue request, the cues are presented in the presentation order and input data is received. If the input data matches the associated one-time password, then access to secure information is granted and the one-time password is invalidated. If the input data does not match the associated one-time password, then access to secure information is denied. In various embodiments, the cues may be text, images, audio, or video. In this way, in an embodiment, one-time passwords may be used in response to cues, which may increase security when accessing information from a non-trusted client because if the one-time password is misappropriated via the non-trusted client, the one-time password is no longer valid for future use.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
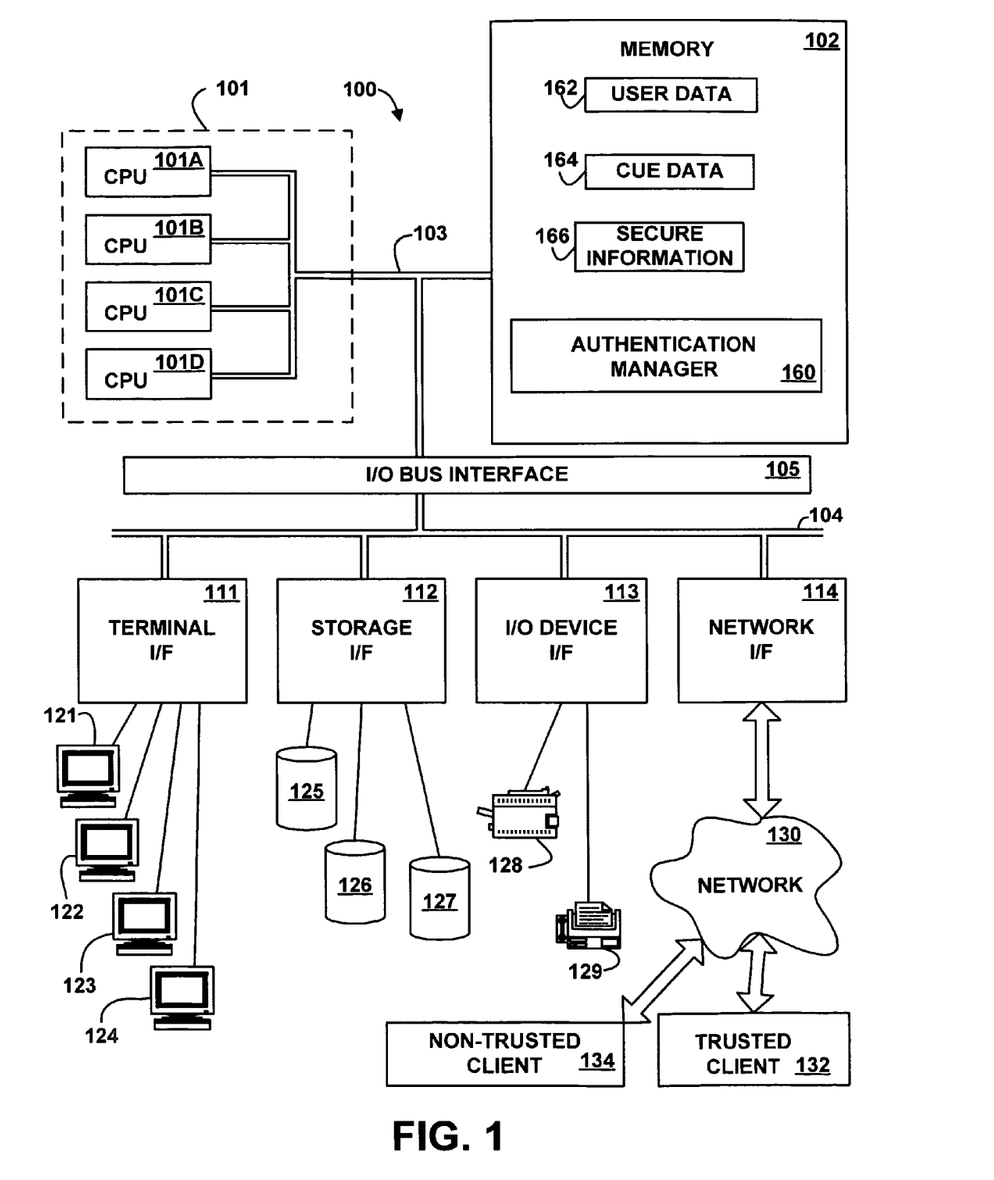
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected via a network 130 to a trusted client 132 and a non-trusted client 134, according to an embodiment of the present invention. The terms "computer," "server," and "client" are used for convenience only, and an electronic device that acts as a server in one embodiment may act as a client in another embodiment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes an authentication manager 160, user data 162, cue data 164, and secure information 166. Although the authentication manager 160, the user data 162, the cue data 164, and the secure information 166 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the authentication manager 160, the user data 162, the cue data 164, and the secure information 166 are illustrated as being contained within the main memory 102, these elements are not necessarily all completely contained in the same storage device at the same time. Further, although the authentication manager 160, the user data 162, the cue data 164, and the secure information 166 are illustrated as being separate entities, in other embodiments some of them, or portions of some of them, may be packaged together.

The authentication manager 160 authenticates users, via the user data 162 and/or the cue data 164, who attempt to access the secure information 166 from the trusted clients 132 and/or the non-trusted clients 134. The secure information 166 may be any information, data, or code for which restricted access is desirable. Examples of the secure information 166 include confidential information, trade secrets, financial information, personal identifying information, passwords, business plans, client lists, text, audio, video, or any other appropriate information. Although the secure information 166 is illustrated as being stored in the memory 102, in another embodiment, the secure information 166 may exist outside a computing device. For example, the secure information 166 may be a physical object(s) that exists within an enclosed room or other enclosure, and the authentication manager 160 may control access to the secure information 166 via a locked door or other opening. The user data 162 is further described below with reference to FIG. 5. The cue data 164 is further described below with reference to FIG. 6.

The authentication manager 160 includes instructions capable of executing on the processor 101 or statements capable of being interpreted by instructions executing on the processor 101 to perform the functions as further described below with reference to FIGS. 7 and 8. In another embodiment, the authentication manager 160 may be implemented in microcode or firmware. In another embodiment, the authentication manager 160 may be implemented in hardware via logic gates and/or other appropriate hardware techniques in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network, e.g., WiFi (Wireless Fidelity). In still another embodiment, the network 130 may be any suitable network or combination of networks. Although one network 130 is shown, in other embodiments any number (including zero) of networks (of the same or different types) may be present.

The trusted client 132 is trusted by the user to be a more secure mechanism for accessing the secure information 166 than the non-trusted client 134. Examples of trusted clients 132 may include the user's home or work computer. Examples of non-trusted clients 134 may include a publicly-accessible computer at an Internet cafe or library or the user's personal computer when accessing the secure information 166 via a network whose security is unknown, e.g., via a wireless hotspot. In an embodiment, a client is either the trusted client 132 or the non-trusted client 134 based on the type of network with which the client is connected to the secure information 166. In another embodiment, a client is either the trusted client 132 or the non-trusted client 134 based on the number and/or type of users who have access to the client. In another embodiment, the user decides whether a particular client is the trusted client 132 or the non-trusted client 134 based on the user's own subjective and personal criteria when accessing that client.

The clients 132 and 134 may include some or all of the hardware and/or software elements previously described above for the computer system 100. Although the clients 132 and 134 are illustrated as being separate from the computer system 100 and connected to the compute system 100 via the network 130, in other embodiments, some or all of the clients 132 and 134 may be a part of the computer system 100, and the network 130 may be optional, not present, or not used.

It should be understood that FIG. 1 is intended to depict the representative major components of the computer system 100, the network 130, the trusted clients 132, and the non-trusted clients 134 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100, via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

The tangible signal-bearing media may be operatively connected (directly or indirectly) to a processing unit, such as the processor 101. Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
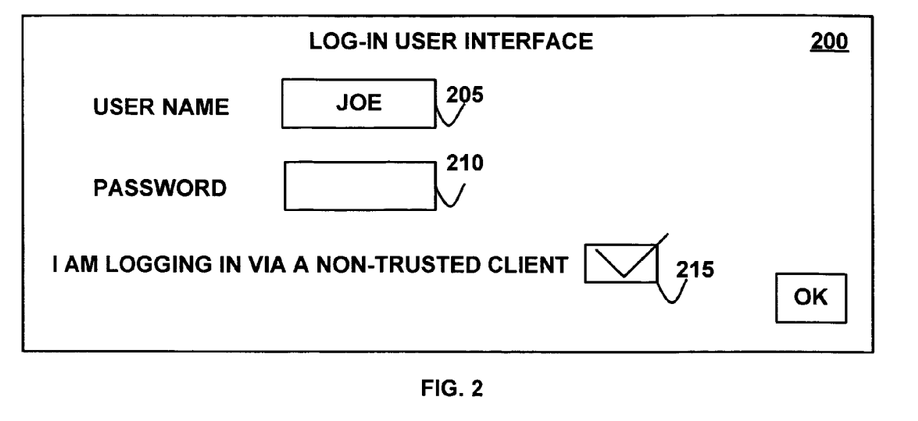
FIG. 2 depicts a block diagram of an example log-in user interface, according to an embodiment of the invention.

FIG. 2 depicts a block diagram of an example log-in user interface 200, according to an embodiment of the invention. The example log-in user interface 200 includes a user name field 205, a password field 210, and an indication of logging in from a non-trusted client field 215. In various embodiments, the user name field 205 allows a user to specify an identifier of the user or of an account associated with the user to the authentication manager 160. The password field 210 allows a user to specify a regular password (as opposed to one-time password) as input data. The indication field 215 allows the submission of a cue request or a specification that the user associated with the user name field 205 is attempting to access the secure information 166 via a non-trusted client 134, as opposed to a trusted client 132. By operation of the log-in user interface 200, the username 205 requests access to the secure information 166.

Figure 3:
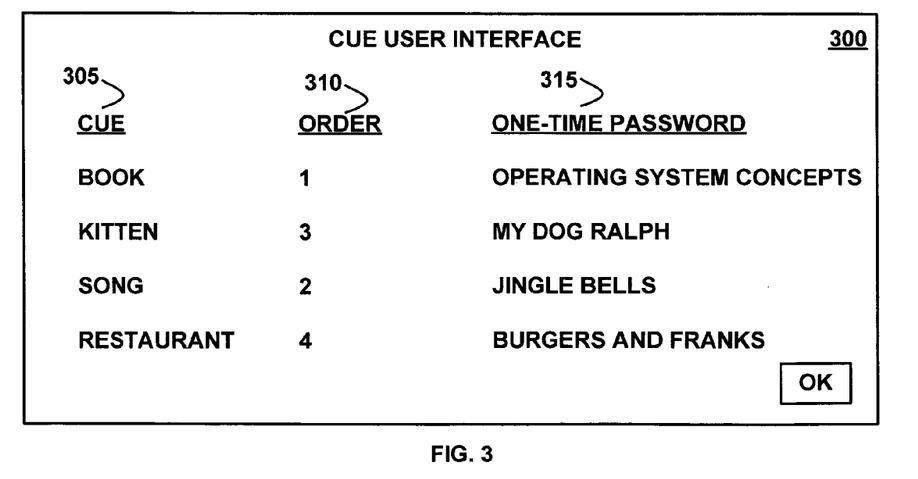
FIG. 3 depicts a block diagram of an example cue user interface, according to an embodiment of the invention.

FIG. 3 depicts a block diagram of an example cue user interface 300, according to an embodiment of the invention. The authentication manger 160 presents the cue user interface 300 in response to a request from a user associated with the user name 205 and password 210. The cue user interface 300 includes cues 305, an optional presentation order 310 of the respective cues 305, and one-time passwords 315, which are associated with the respective cues 305. The cue user interface 300 allows the user to input the cues 305, the optional order 310, and the one-time passwords 315.

In various embodiments, the cues 305 may be text, images, audio, video, or any combination thereof. The cues 305 are meaningful to the user, in that the user may choose the cues 305 so as to invoke the one-time passwords 315 in the user's mind, but not in the mind of an unauthorized person. The authentication manager 160 receives the cues 305, the order 310, and the one-time passwords 315 from the user interface 300 and later presents the cues 305 in the specified presentation order 310. Once a particular cue has been invalidated by having been successfully used, then the authentication manager 160 may present a subsequent cue in the order 310. In response to the later presentation of the cues 305 in the presentation order 310, the user later enters the respective associated one-time passwords 315 as input data, and the authentication manger 160 verifies or authenticates that the input data by comparing the input data to the respective one-time passwords 315.

For example, in response to the example data of the user interface 300, the authentication manager 160 saves the cues 305, the order 310, and the one-time passwords 315. In response to the user later requesting access to the secure information 166 and requesting a cue, the authentication manager 160 presents the first ordered cue 305, which is "book." In response, the authentication manager 160 expects to receive the associated one-time password 315 of "operating system concepts." If the authentication manager 160 receives input data of "operating system concepts," then the authentication manger 160 grants access to the secure information 166 and invalidates this cue and one-time password from future use. If the user later requests access to the secure information 166 and requests a cue again, the authentication manager 160 presents the next ordered cue 305 (in the order 310), which is "song." In response, the authentication manager 160 expects to receive the associated one-time password 315 of "jingle bells." The authentication manager 160 continues in a similar manner presenting the cues 305 and expecting the associated one-time passwords 315 in the order 310.

Figure 4:
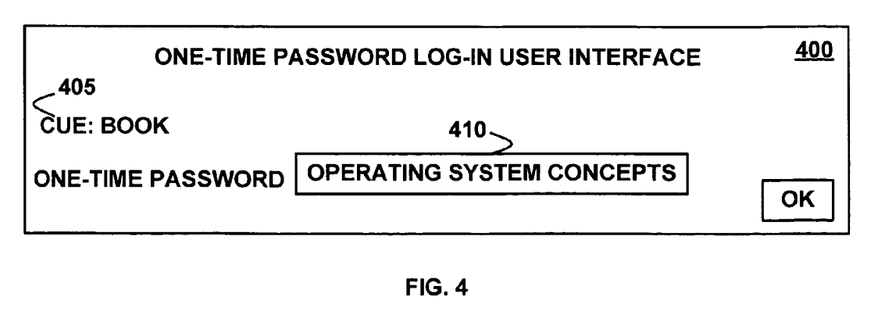
FIG. 4 depicts a block diagram of an example one-time password user interface, according to an embodiment of the invention.

FIG. 4 depicts a block diagram of an example one-time password user interface 400, according to an embodiment of the invention. The example one-time password user interface 400 includes a cue 405, which the authentication manager 160 presented in response to the cue request 215 (FIG. 2). In response to the cue presentation 405, the user submits the input data 410, which the authentication manger 160 authenticates against the one-time passwords 315, as previously described above with reference to FIG. 2 and as further described below with reference to FIG. 8.

Figure 5:
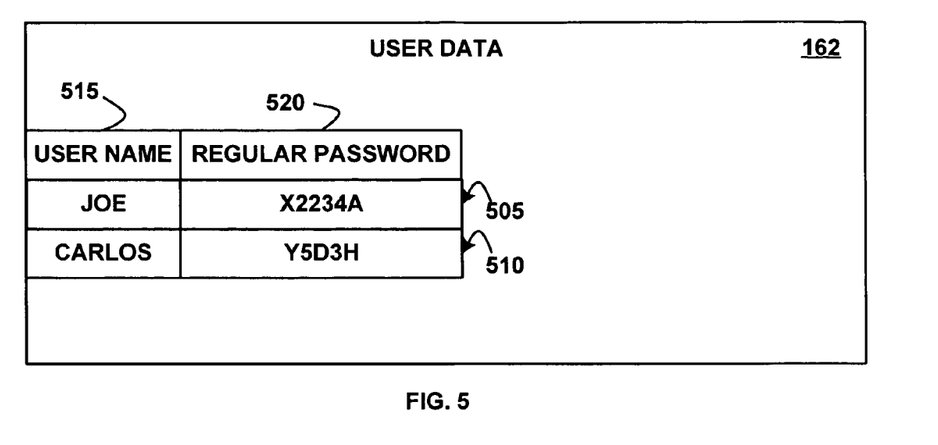
FIG. 5 depicts a block diagram of a data structure for user data, according to an embodiment of the invention.

FIG. 5 depicts a block diagram of a data structure for the user data 162, according to an embodiment of the invention. The user data 162 includes records 505 and 510, but in other embodiments any number of records with any appropriate data may be present. Each of the records 505 and 510 includes a user name field 515 and a regular password field 520, but in other embodiments more or fewer fields may be present. The user name field 515 stores valid users who are authorized to access the secure information 166. The regular password field 520 stores respective passwords associated with the user names 515. The passwords 520 are regular in the sense that they are not one-time passwords and are intended for use via the trusted clients 132. When requesting access to the secure information 166 via the trusted client 132, the users submit their user names and passwords via the user name field 205 and password field 210 of FIG. 2, and the authentication manager 160 authenticates the submitted user names and passwords against the user name field 515 and the regular password field 520, as further described below with reference to FIG. 7.

Figure 6:
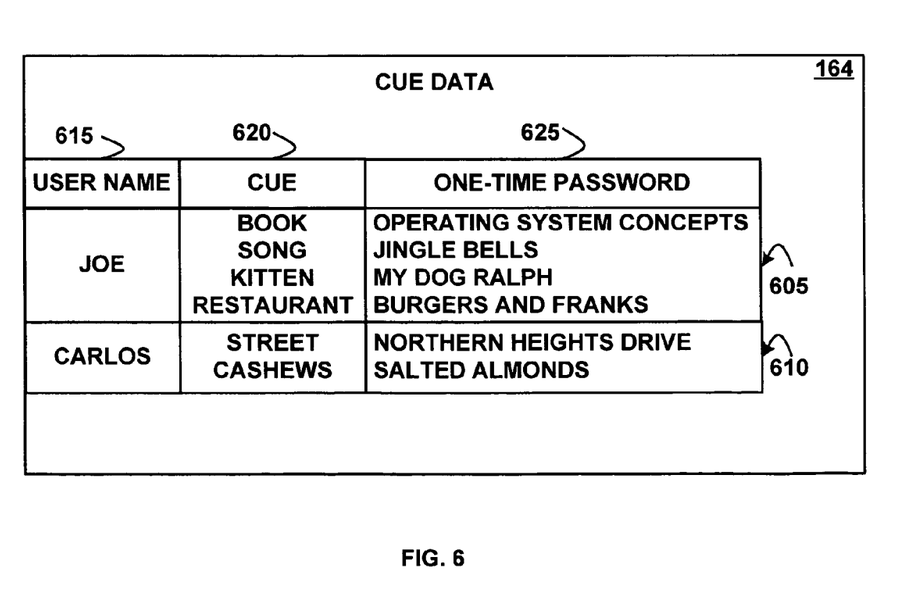
FIG. 6 depicts a block diagram of a data structure for cue data, according to an embodiment of the invention.

FIG. 6 depicts a block diagram of a data structure for the cue data 164, according to an embodiment of the invention. The cue data 164 includes records 605 and 610, but in other embodiments any number of records with any appropriate data may be present. Each of the records 605 and 610 includes a user name field 615, a cue field 620, and a one-time password field 625, but in other embodiments more or fewer fields may be present. Each of the records 605 and 610 is associated with one of the records in the user data 162. For example, the record 605 is associated with the record 505, and the record 610 is associated with the record 510. The user name field 615 identifies the associated user and is associated with the user name 515. The cue field 620 stores a list of the cues 305 in the order 310 for an associated user name 615. The one-time password field 625 stores a list of the one-time passwords 315 in the order 310 for an associated user name 615.

Figure 7:
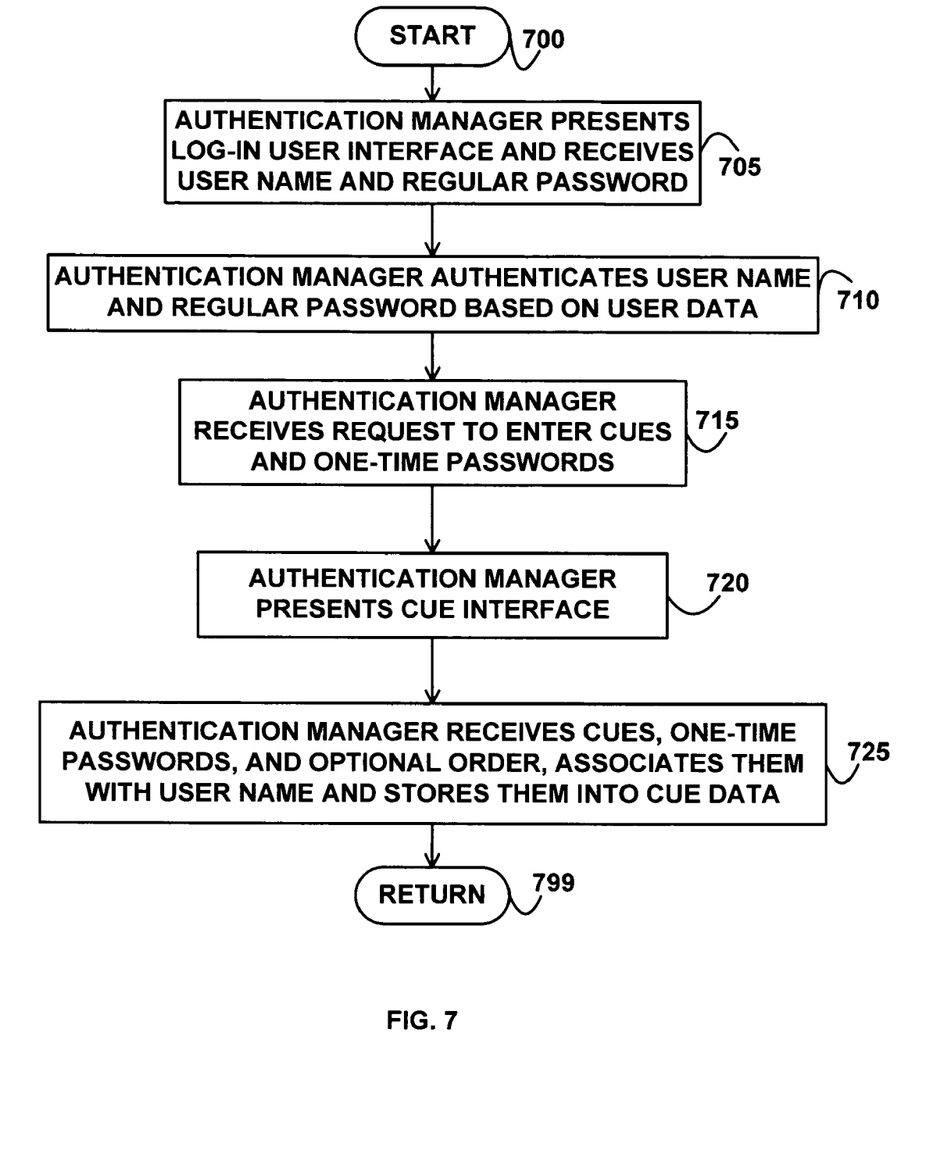
FIG. 7 depicts a flowchart of example processing for creating cues and associated one-time passwords, according to an embodiment of the invention.

FIG. 7 depicts a flowchart of example processing for creating cues and associated one-time passwords, according to an embodiment of the invention. Control begins at block 700. Control then continues to block 705 where the authentication manager 160 presents the login user interface 200 and receives the username 205 and regular password 210. Control then continues to block 710 where the authentication manager 160 authenticates the username 205 and regular password 210 based on the user data 162 and grants the user access to the secure information 166 if the user name and password are authentic. The authentication manager 160 performs the authentication by using the username 205 as an index into the user data 162 via the username field 515 to find a record, such as the record 505 or 510, and compares the received regular password 210 against the contents of the regular password field 520.

Control then continues to block 715 where the authentication manager 160 receives a request to enter cues and one-time passwords. Control then continues to block 720 where the authentication manager 160 presents the cue user interface 300, as previously described above with reference to FIG. 3. Control then continues to block 725 where the authentication manager 160 receives the cues 305, the optional presentation order 310, and the one-time passwords 315. The authentication manager 160 further associates the cues, the one-time passwords, and the optional order with the username and stores the received username 205 in the username field 615, stores the received cues 305 in the cue field 620, and stores the received one-time passwords 315 in the one-time password field 625 of the cue data 164. The authentication manager 160 stores the list of cues 620 and the list of one-time passwords 625 in the presentation order 310.

Control then continues to block 799 where the logic of FIG. 7 returns.

Figure 8:
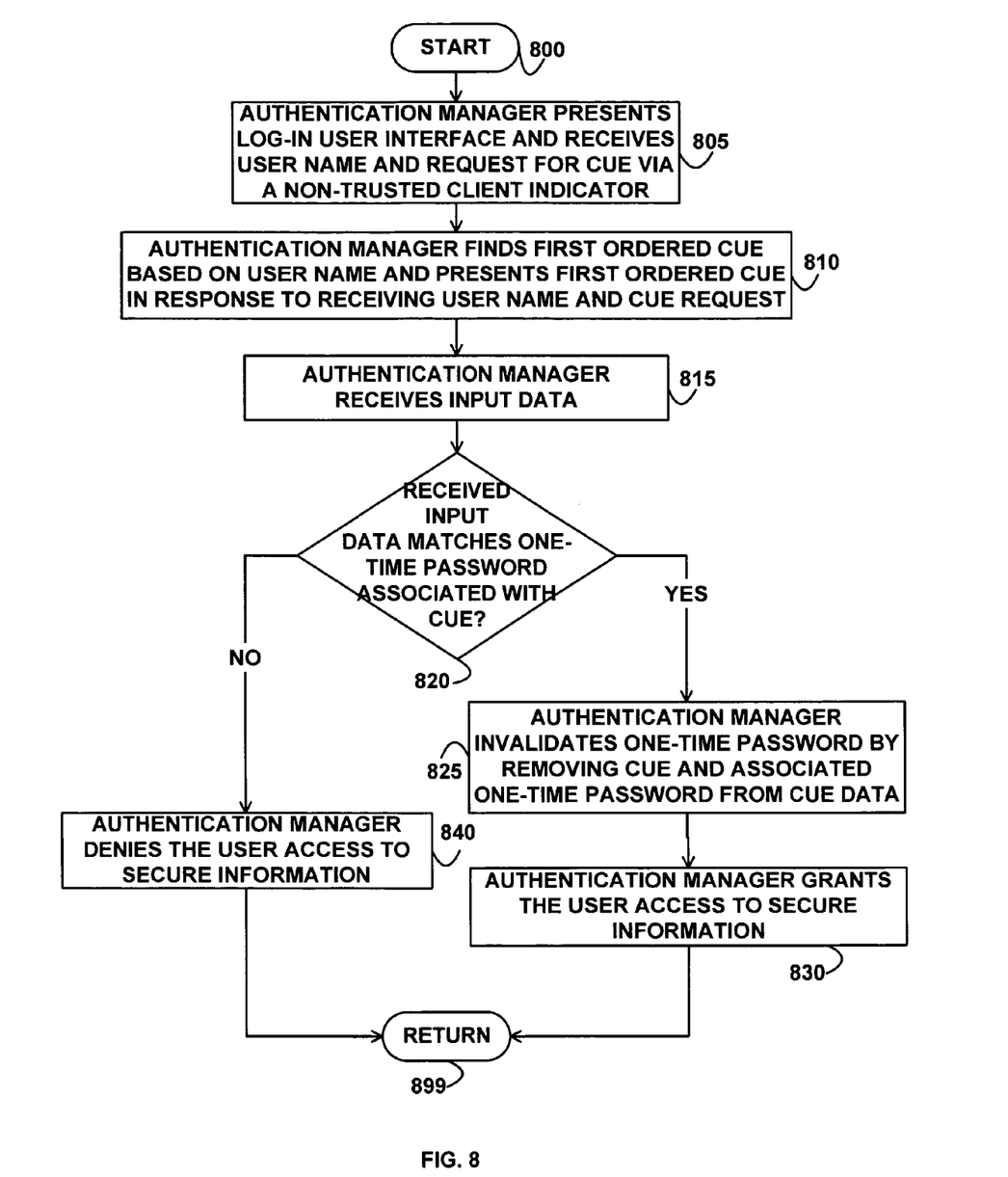
FIG. 8 depicts a flowchart of example processing for presenting cues and authenticating one-time passwords, according to an embodiment of the invention.

FIG. 8 depicts a flowchart of example processing for presenting cues and authenticating one-time passwords, according to an embodiment of the invention. Control begins at block 800. Control then continues to block 805 where the authentication manager 160 presents the log-in user interface 200 and receives the username 205 and a request for a cue via the non-trusted client indicator 215, as previously described above with reference to FIG. 2. Control then continues to block 810 where the authentication manager 160, in response to receiving the username and cue request, finds the first ordered cue in the cue list 620 associated with the received username 205 by using the received username 205 as an index into the username field 615 to find the associated record. The authentication manager 160 then finds the first ordered cue in the cue list field 620 of the found record and presents the first ordered cue, as previously described above with reference to FIG. 4. For example, the first ordered cue 620 in the record 605 is "book," illustrated as the cue 405 in FIG. 4.

Control then continues to block 815 where the authentication manager 160 receives the input data 410, which is the user's submission of a one-time password. Control then continues to block 820 where the authentication manager 160 determines whether the received input data 410 matches the one-time password associated with the presented cue. The authentication manager finds the one-time password 625 that is associated with the first ordered cue 620 (e.g., the "operating system concepts" one-time password is associated with the "book" cue in the record 605 of FIG. 6), and compares the received input data with the found one-time password.

If the determination at block 820 is true, then the received input data 410 matches the one-time password associated with the presented cue 405, so control continues to block 825 where the authentication manger 160 invalidates the one-time password by removing the cue and the associated one-time password from the lists of valid cues 620 and one-time passwords 625 in the cue data 164. For example, the authentication manager 160 removes "operating system concepts" from the one-time password 625 and "book" from the cue 620 in the record 605 associated with the username "Joe." Control then continues to block 830 where the authentication manager 160 grants the user associated with the username 615 access to the secure information 166. Control then continues to block 899 where the logic of FIG. 8 returns.

If the determination at block 820 is false, then the received input data 410 does not match the one-time password associated with the presented cue 405, so control continues to block 840 where the authentication manager 160 denies the user associated with the username 615 access to the secure information 166. Control then continues to block 899 where the logic of FIG. 8 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    receiving a user name and a regular password associated with the user name via a trusted client, wherein a user associated with the user name trusts the trusted client to be a more secure mechanism for accessing secure information than a non-trusted client;
    authenticating the user name and the regular password and granting access to the secure information in response to the receiving the user name and the regular password;
    receiving a plurality of cues, a plurality of respective associated one-time passwords, and a presentation order of the plurality of cues from the user in response to the authenticating the user name and the regular password and in response to a request from the user;
    associating the plurality of cues and the plurality of one-time passwords with the user name;
    receiving a cue request, the user name, and a specification that the user associated with the user name does not trust the non-trusted client;
    presenting a presented cue of the plurality of cues in response to the receiving the cue request, the user name, and the specification that the user does not trusted the non-trusted client;
    receiving input data in response to the presenting;
    determining whether the input data matches the one-time password associated with the presented cue; and
    granting access to the secure information, invalidating the one-time password that is associated with the presented cue, and removing the presented cue and the associated one-time password from a list of valid one-time passwords and cues if the input data matches the one-time password that is associated with the presented cue.

2. The method of claim 1, further comprising:
    if the determining is false, denying access to the secure information.

3. The method of claim 1, wherein the one-time password comprises text.

4. The method of claim 1, wherein the one-time password comprises audio.

5. The method of claim 1, wherein the one-time password comprises video.

6. A storage medium encoded with instructions, wherein the instructions when executed comprise:
    receiving a user name and a regular password associated with the user name via a trusted client, wherein a user associated with the user name trusts the trusted client to be a more secure mechanism for accessing secure information than a non-trusted client;
    authenticating the user name and the regular password and granting access to the secure information in response to the receiving the user name and the regular password;
    receiving a plurality of cues, a plurality of respective associated one-time passwords, and a presentation order of the plurality of cues from the user in response to the authenticating the user name and the regular password and in response to a request from the user;

associating the plurality of cues and the plurality of one-time passwords with the user name;

receiving a cue request, the user name, and a specification that the user associated with the user name does not trust the non-trusted client;

presenting a presented cue of the plurality of cues in response to the receiving the cue request, the user name, and the specification that the user does not trusted the non-trusted client;

receiving input data in response to the presenting;

determining whether the input data matches the one-time password that is associated with the presented cue; and granting access to the secure information, invalidating the one-time password that is associated with the presented cue, and removing the presented cue and the associated one-time password from a list of valid one-time passwords and cues if the input data matches the one-time password that is associated with the presented cue.

7. The storage medium of claim 6, wherein the one-time password comprises text.

8. The storage medium of claim 7, further comprising:

if the determining is false, denying access to the secure information.

9. The storage medium of claim 7, wherein the one-time password comprises audio.

10. The storage medium of claim 9, wherein the presenting further comprises:

choosing the presented cue based on the presentation order.

11. The storage medium of claim 7, wherein the one-time password comprises video.

12. A method for configuring a computer, comprising:

configuring the computer to receive a user name and a regular password associated with the user name via a trusted client, wherein a user associated with the user name trusts the trusted client to be a more secure mechanism for accessing secure information than a non-trusted client;

configuring the computer to authenticate the user name and the regular password and grant access to the secure information in response to the receive of the user name and the regular password;

configuring the computer to receive a plurality of cues, a plurality of respective associated one-time passwords, and a presentation order of the plurality of cues from the user in response to the authenticating the user name and the regular password and in response to a request from the user;

configuring the computer to associate the plurality of cues and the plurality of one-time passwords with the user name;

configuring the computer to receive a cue request, the user name, and a specification that the user associated with the user name does not trust the non-trusted client;

configuring the computer to present a presented cue of the plurality of cues in response to the receive of the cue request, the user name, and the specification that the user does not trust the non-trusted client;

configuring the computer to receive input data in response to the configuring the computer to present;

configuring the computer to determine whether the input data matches the one-time password that is associated with the presented cue;

configuring the computer to grant access to the secure information, invalidate the one-time password that is associated with the presented cue, and remove the presented cue and the associated one-time password from a list of valid one-time passwords and cues if the input data matches the one-time password that is associated with the presented cue.

13. The method of claim 12, wherein the one-time password comprises text.

14. The method of claim 13, wherein the one-time password comprises audio.

15. The method of claim 12, further comprising:

configuring the computer to deny access to the secure information if the determination is false.

16. The method of claim 12, wherein the configuring the computer to present further comprises:

configuring the computer to choose the presented cue based on the presentation order.

* * * * *